United States Patent [19]

Bingham et al.

[11] Patent Number: 4,941,158
[45] Date of Patent: Jul. 10, 1990

[54] NUCLEAR REACTIVITY CONTROL CONFIGURATION

[75] Inventors: Billy E. Bingham; Richard V. DeMars, both of Lynchburg, Va.

[73] Assignee: The Babcock & Wilcox Company, New Orleans, La.

[21] Appl. No.: 330,410

[22] Filed: Mar. 30, 1989

[51] Int. Cl.$^5$ ............................................. G21C 7/10
[52] U.S. Cl. ...................................... 376/332; 376/333
[58] Field of Search ........................ 376/333, 332, 223

[56] References Cited

U.S. PATENT DOCUMENTS

| | | | |
|---|---|---|---|
| 2,852,458 | 9/1958 | Dietrich et al. | 375/223 |
| 2,898,281 | 8/1959 | Untermyer et al. | 376/333 |
| 2,904,487 | 9/1959 | Dickson | 376/223 |
| 3,079,320 | 2/1963 | Weill | 376/223 |
| 3,103,479 | 9/1963 | Ransohoff | 376/332 |
| 3,149,048 | 9/1964 | Bevilacqua et al. | 376/333 |
| 3,218,236 | 11/1965 | Tollet | 376/333 |
| 3,227,624 | 1/1966 | Lechevallier | 376/332 |
| 3,347,747 | 10/1967 | West et al. | 376/332 |
| 3,485,717 | 12/1969 | Eich | 376/333 |
| 4,707,329 | 11/1987 | Freeman | 376/333 |

FOREIGN PATENT DOCUMENTS

| | | | |
|---|---|---|---|
| 1049014 | 9/1957 | Fed. Rep. of Germany | 376/332 |
| 1151608 | 7/1963 | Fed. Rep. of Germany | 376/333 |
| 1207522 | 12/1965 | Fed. Rep. of Germany | 376/333 |
| 1251731 | 12/1960 | France | 376/223 |
| 127996 | 11/1978 | Japan | 373/223 |
| 317328 | 6/1972 | U.S.S.R. | 376/332 |

Primary Examiner—Harvey E. Behrend
Attorney, Agent, or Firm—Robert J. Edwards; D. Niel LaHaye

[57] ABSTRACT

A neutron flux control component for a nuclear reactor. Thin, overlapping segments of highly neutron absorbing material are positioned in the core of a reactor. The self-shielding overlapping segments are moved relative to each other to vary the amount of exposed surface area of poison to control core reactivity and to provide power shaping within the reactor core. The poison segments are mounted to carriers in the form of close-fitting concentric cylinders or rods of V-shaped cross section.

1 Claim, 3 Drawing Sheets

NUCLEAR REACTIVITY CONTROL CONFIGURATION

BACKGROUND OF THE INVENTION

1. Field of the Invention

The present invention is generally related to reactivity control of nuclear reactors and in particular to active control of reactivity with a variable distributed neutron poison configuration.

2. General Background

Reactivity in nuclear reactors is regulated by adding or removing materials that either absorb (poison), moderate (slow), or reflect (modify leakage of) neutrons. Reactivity can also be controlled by adding or removing fissionable material. Reactivity can be controlled indirectly through a change in the temperature of the core materials. Temperature affects neutron absorption characteristics and thermal expansion changes the physical relationship of the core constituents which in turn changes the neutron leakage from the reactor core. The intentional change in reactivity, such as by adding poison material, is referred to as active control. A natural change in reactivity, such as may occur from an increase in reactor temperature, is referred to as passive control. A common method of active control in light water reactors is by the use of control rods or blades. The control rods contain a neutron poison such as boron carbide, silver indium-cadmium alloy, or hafnium. The rods are progressively inserted into the core from one end, absorbing neutrons and reducing reactivity in the vicinity of the rods. The size and number of rods and the amount of insertion is varied to achieve the desired level of reactivity or reactor control. Another method of active control, used mainly in compact reactors, is the rotation of control drums. Control drums are positioned in a wide band of neutron reflecting material, such as beryllium, that surrounds the core and serves to reduce leakage of neutrons from the core. Control drums are formed from a cylinder having reflector material along the full length of approximately two thirds of the cylinder and a poison material, such as boron carbide, along the length of the remainder of the cylinder. When the drum is positioned with the poison toward the center of the core, neutrons are absorbed, reducing the core reactivity. When the drum is rotated to position the reflector material toward the core, fewer neutrons are absorbed and more are reflected back into the core. This increases core reactivity, particularly around the periphery of the core. Another means of active control includes the addition of a soluble poison such as boric acid to the coolant. The concentration of boric acid is adjusted to control core reactivity to the desired level. Passive reactivity control is also utilized in most reactors to limit an overheating event. Such reactors are known to have a negative reactivity temperature coefficient or doppler coefficient. When a reactor inadvertently generates more power than can be removed, materials get hotter, expand, and in turn, allow more neutrons to leak from the core, resulting in a reduction of power that precludes continued overheating. Also, as the temperature increases the resonance absorption characteristics of the materials broaden and more neutrons are absorbed. Known reactivity control methods include the following.

U.S. Pat. No. 2,987,455 to Huston et al. discloses placing neutron absorbing material within the reactor core and triggering an increase in neutron absorbing material surface area exposed to the neutron flux. An expandible bladder coated with a neutron poison is maintained in a coiled configuration and then expanded to increase the exposed surface area of the poison on the bladder in the event of a reactivity runaway.

U.S. Pat. No. 3,309,284 to Bennett discloses the use of compressional waves of a powdered, gaseous, or liquid neutron poison as a means for controlling nuclear reactivity.

U.S. Pat. No. 3,629,061 to Noyes et al. discloses the substitution of moderator material for structural steel instead of fuel.

U.S. Pat. No. 3,799,839 to Fischer et al. discloses an arrangement of burnable poison in a nuclear reactor core wherein plutonium fuel is used in conjunction with the burnable poison.

U.S. Pat. No. 3,085,962, No. 3,366,546, No. 3,745,069, No. 4,576,787, and No. 4,645,643 disclose a variety of fuel elements and poison control assemblies.

A number of the reactivity controls known and described above are designed to be automatically activated in response to excess reactivity. This does not address the problem of achieving and maintaining uniform power distribution while adjusting core reactivity and reactor power. Ideally, power should be uniform throughout the core to help provide for efficient fuel utilization and maximum power output per unit of core volume. Typically, power peaks at the core center and falls off in both the radial and axial directions. Core power flattening and maintaining uniform power throughout the core life require that the neutron poison burn up at a rate that is compatible with that of the nuclear fuel. Due to inherently different burnup rates between poison and fuel materials, this is not easily achieved.

SUMMARY OF THE INVENTION

The present invention solves the aforementioned problem in a straightforward manner. What is provided is a neutron flux control component for a nuclear reactor which is able to have its neutron absorbing capabilities varied. This is accomplished by using the self-shielding characteristics of multiple layers of very thin but highly neutron absorbing materials that are extended or contracted so as to effectively change their exposed area and accordingly vary their neutron absorbing characteristics. In one embodiment, an array of close concentric fitting cylinders is provided with a helical arrangement of poison whereby exposed surface area of the poison is increased by rotating or axially moving one or more cylinders relative to the other cylinders. In another embodiment, small concentric cylinders may be provided with neutron poison positioned in segments along the cylinders such that rotation of one cylinder relative to the other increases the exposed surface area. In another embodiment horizontal poison segments may be displaced vertically from an overlapping position to increase the exposed surface area.

BRIEF DESCRIPTION OF THE DRAWINGS

For a further understanding of the nature and objects of the present invention, reference should be made to the following description, taken in conjunction with the accompanying drawings in which like parts are given like reference numerals and, wherein.

DETAILED DESCRIPTION OF THE PREFERRED EMBODIMENT

Figure 1:
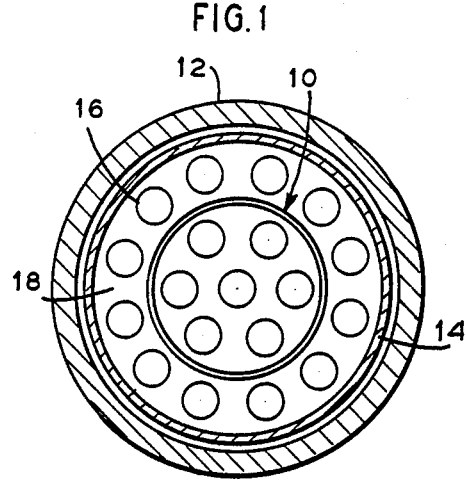
FIG. 1 is a top sectional view of a nuclear reactor with the control component therein.
Figure 2:
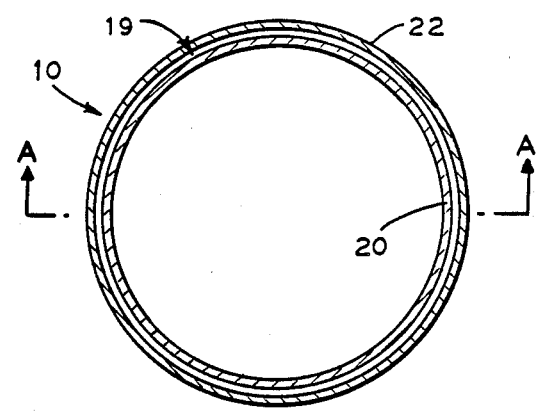
FIG. 2 is an enlarged top sectional view of the control component of FIG. 1.
Figure 3:
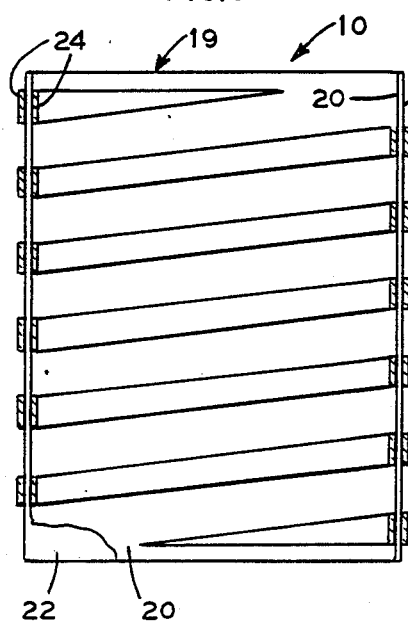
FIG. 3 is a view taken along lines A—A of FIG. 2 illustrating the control component in the overlapped position.
Figure 4:
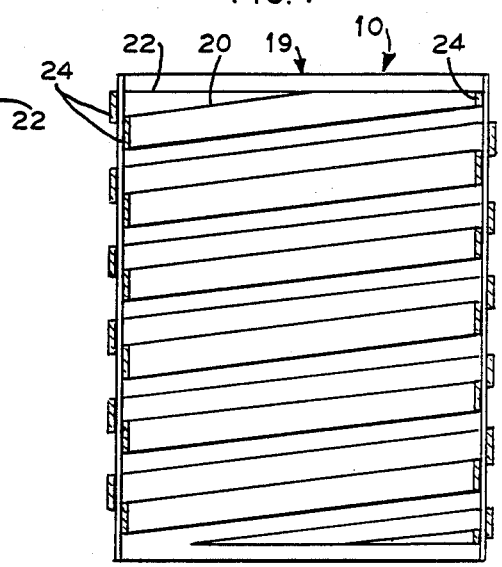
FIG. 4 is a view taken along lines A—A of FIG. 2 illustrating the control component in the rotated position.
Figure 5:
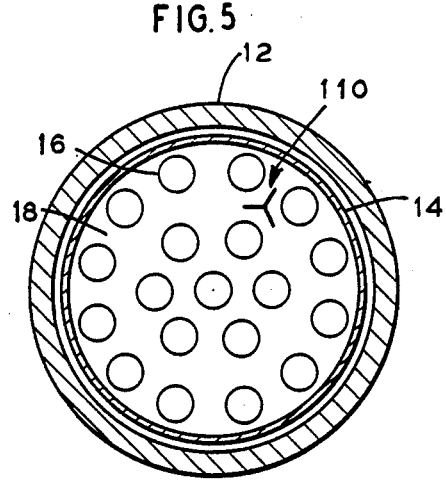
FIG. 5 is a top sectional view of a nuclear reactor with an alternate embodiment of the control component.

Referring to the drawings, it is seen in FIGS. 1-4 that the invention is generally referred to by the numeral 10. Control component 10 is illustrated in position inside a representative small nuclear reactor core comprised of radial reflector 12, reactor vessel 14, fuel elements 16, and moderator 18. As seen in FIG. 1, control component 10 encompasses and, in the maximum poison condition, tends to isolate the inner seven fuel elements 16 from the outer twelve fuel elements 16. For pusposes of illustration, FIGS. 2-4 are utilized to generally depict control component 10. Control component 10 is comprised of at least two carrier sheets 19 and neutron poison segments 24. Carrier sheets 19 are close-fitting and movable relative to each other. At least two substantially identical poison segments 24 are provided, one on each carrier sheet 19, and are movable between overlapped and exposed positions in response to movement of carrier sheet 19. In the exposed position, more surface area of poison segments 24 is exposed resulting in the absorption of more neutrons and controlling reactor power. Poison segments 24 may be attached to carrier sheets 19 or may be integral therewith. Each poison segment is designed to be capable of absorbing at least 80% of the neutrons that may strike its surface and each has a width greater than three times the effective thickness of the assembly of overlapping poison segments 24. As seen in the embodiment of FIGS. 2-4, control component 10 utilizes carrier sheets 19 in the form of two concentric cylinders 20, 22 with one being rotatable relative to the other. Inner and outer cylinders 20, 22 are provided with neutron poison segments 24 along the walls thereof. As best seen in FIGS. 3 and 4, a plurality of neutron poison segments 24 are provided around the circumference of each cylinder 20, 22 and spaced along the longitudinal axis thereof. This provides an alternating pattern of poisonous and non-poisonous sections along each cylinder. Poison segments 24 are positioned in substantially identical helical patterns on each cylinder 20, 22 such that when in a first overlapped positioned (FIG. 3) the exposed surface area of poison segments 24 is at a minimum. When one of the cylinders 20, 22 is moved to a second exposed position (FIG. 4) poison segments 24 on that cylinder increase the exposed surface area of poison segments 24, resulting in reduced reactor core reactivity. Naturally, intermediate positions between the fully overlapped and exposed positions may also be selected depending on the need for control.

Figure 6:
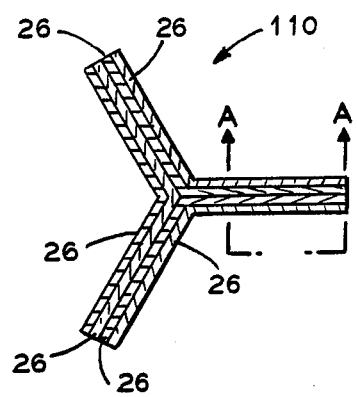
FIG. 6 is an enlarged detail view of the control component of FIG. 5.
Figure 7:
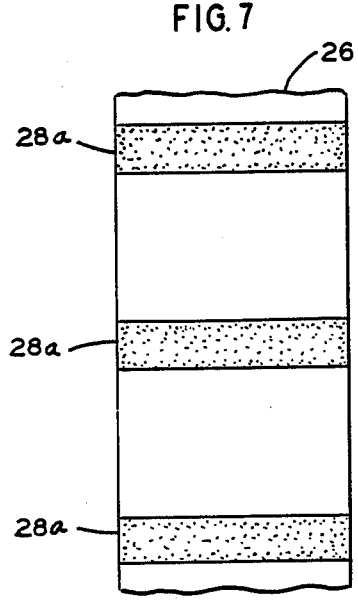
FIG. 7 is a view taken along lines A—A of FIG. 6 illustrating the control component in the overlapped position.
Figure 8:
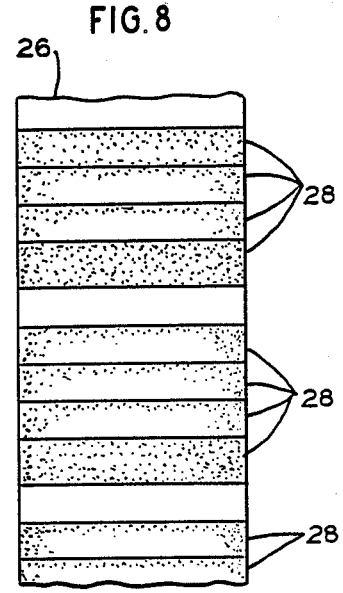
FIG. 8 is a view taken along lines A—A of FIG. 6 illustrating the control component in the extended or exposed position.
Figure 9:
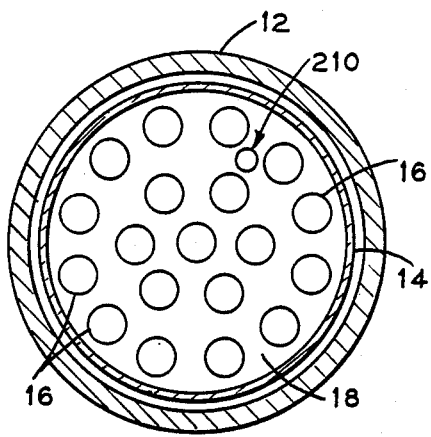
FIG. 9 is a top sectional view of a nuclear reactor with an alternate embodiment of the control component.
Figure 10:
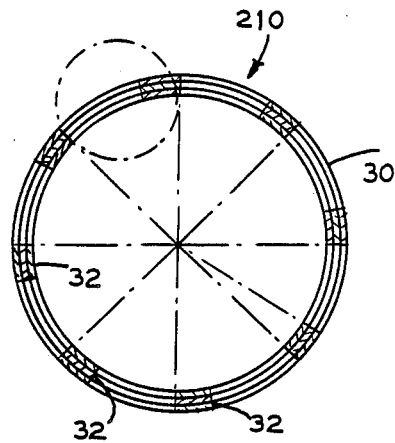
FIG. 10 is an enlarged detail view of the control component of FIG. 9.
Figure 11:
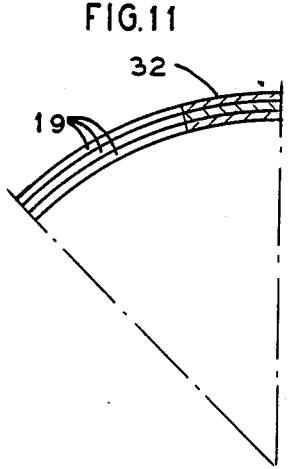
FIG. 11 is a view of the circled portion of the component of FIG. 10 in the overlapped position.

A second embodiment of the invention is illustrated in FIGS. 5-8 and designated by the numeral 110. Control component 110 is substantially Y-shaped and positioned between fuel elements 16. Although only one control component 110 is shown for ease of illustration it should be understood that a number of such components may be utilized. Control component 110 utilizes carrier sheets 19 in the form of a plurality of rods 26 having an open V-shaped cross section. In the preferred embodiment, rods 26 are slidably nested together as seen in FIG. 6 to provide a Y-shaped cross section. Rods 26 are respectively provided with a plurality of horizontal neutron poison segments 28 spaced along the longitudinal axis thereof. Poison segments 28 are positioned such that they may be moved between an overlapped position (FIG. 7) and an exposed position (FIG. 8) to vary the exposed surface area of the poison segments 28. This is accomplished by movement of rods 26 along their longitudinal axis.

Figure 12:
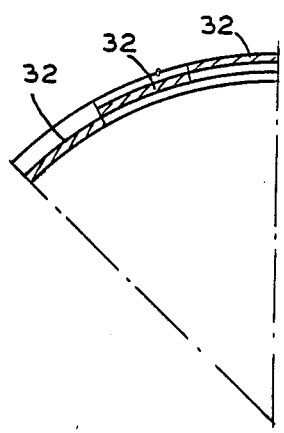
FIG. 12 is a view of the circled portion of the component of FIG. 10 in the extended or exposed position.

A third embodiment of the invention is illustrated in FIGS. 9-12 and designated by the numeral 210. Although only one control component 210 is shown for ease of illustration, it should be understood that more than one may be utilized. Control component 210 utilizes carrier sheets 19 in the form of three concentric cylinders 30 in the preferred embodiment. At least two of cylinders 30 are rotatable relative to each other and the remaining stationary cylinder. A plurality of substantially equally sized neutron poison segments 32 are provided along the longitudinal axis of each cylinder 30. Cylinders 30 are all provided with the same number of neutron poison segments 32 such that rotation of cylinders 30 move poison segments 32 between an overlapped position (FIG. 11) and an exposed position (FIG. 12). This provides for variation of exposed surface ares and ease of reactivity control. Naturally, cylinders 30 may be selectively rotated to any control position between that of FIGS. 11 and 12.

In the preferred embodiments of this invention, the poison is sized so that each layer is sufficiently thick to absorb more than 80% of the neutrons striking either side and that the width is more than three times the effective thickness of the composite layers. In the embodiments illustrated in FIGS. 2-4 and FIGS. 9-12, poison segments 24 and 32 are shaped so that the overlapping poison strips take the form of one or more strips spaced apart a distance no less than the extended width of the overlapping strips. In the embodiments of FIGS. 2-4 and 9-12, poison segments 24 may have a helix angle of zero to ninety (90) degrees, forming axial strips along cylinders 20, 22 and a series of rings along the length of cylinders 30. In all embodiments the width of the poison segments may be made to vary along the length of the carrier sheets to provide power shaping within the reactor.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A neutron flux control component assembly for use in a nuclear reactor, comprising:
   a. at least three V-shaped close fitting carrier sheets nested together to provide a Y-shaped cross section and which are movable relative to each other along their longitudinal axis;
   b. at least three substantially identical neutron poison segments, one on each of said carrier sheets, movable between overlapped and exposed positions in response to movement of said carrier sheets; and
   c. each of said poison segments having a width greater than three times the effective thickness of the assembly of overlapping poison segments and capable of absorbing at least eighty percent of the neutrons that strike its surface.

* * * * *